US011419116B2

(12) United States Patent
Tong et al.

(10) Patent No.: US 11,419,116 B2
(45) Date of Patent: Aug. 16, 2022

(54) CARRIER AGGREGATION AND DUAL CONNECTIVITY CAPABILITY EXCHANGE

(71) Applicants: AT&T Intellectual Property I, L.P., Atlanta, GA (US); AT&T Mobility II LLC, Atlanta, GA (US)

(72) Inventors: Yonghui Tong, Alpharetta, GA (US); Wen Yang, Bellevue, WA (US); Yupeng Jia, Austin, TX (US); Yi Shen, Seminole, FL (US); Marc B. Grant, Austin, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 16/930,019

(22) Filed: Jul. 15, 2020

(65) Prior Publication Data
US 2020/0351880 A1    Nov. 5, 2020

Related U.S. Application Data

(63) Continuation of application No. 15/971,562, filed on May 4, 2018, now Pat. No. 10,750,501.

(51) Int. Cl.
*H04W 72/04* (2009.01)
*H04W 76/27* (2018.01)

(52) U.S. Cl.
CPC ..... *H04W 72/0453* (2013.01); *H04W 72/048* (2013.01); *H04W 76/27* (2018.02)

(58) Field of Classification Search
None
See application file for complete search history.

(56) References Cited

U.S. PATENT DOCUMENTS 9,253,729 B1   2/2016   Sundar et al.
9,674,314 B2   6/2017   Hans et al.
(Continued)

FOREIGN PATENT DOCUMENTS

EP   2942986 A1   11/2015
EP   3288306 A1   2/2018
(Continued)

OTHER PUBLICATIONS

Non-Final Office Action received for U.S. Appl. No. 15/971,562 dated Jan. 27, 2020, 20 pages.

*Primary Examiner* — Alex Skripnikov
(74) *Attorney, Agent, or Firm* — Amin, Turocy & Watson, LLP

(57) ABSTRACT

Various embodiments disclosed herein provide for a compressed user equipment (UE) capability message that can indicate to a mobile network the various capabilities of the UE. In particular, the carrier aggregation and dual connectivity capabilities are compressed as disclosed herein. In traditional implementations, each carrier aggregation and dual connectivity combination and implementation that is supported is explicitly indicated in the message. As disclosed herein, rather than listing explicit combinations, the UE capability message can be compressed by instead listing boundary values of several different parameters which can be used by the network to derive the carrier aggregation and dual connectivity combinations. The UE capability message can also list the boundary values for LTE (Long Term Evolution), NR (New Radio, or 5G), and Dual Connectivity separately within the message to reduce ambiguity.

20 Claims, 10 Drawing Sheets

(56) References Cited

U.S. PATENT DOCUMENTS

| | | | |
|---|---|---|---|
| 9,999,052 B1* | 6/2018 | Marupaduga | H04W 72/0406 |
| 11,202,283 B2* | 12/2021 | Takahashi | H04B 7/0486 |
| 2011/0319069 A1 | 12/2011 | Li | |
| 2012/0202544 A1* | 8/2012 | Kim | H04W 52/146 |
| | | | 455/509 |
| 2014/0328228 A1 | 11/2014 | Park et al. | |
| 2014/0370905 A1 | 12/2014 | Kim et al. | |
| 2017/0013557 A1 | 1/2017 | Koc et al. | |
| 2017/0078926 A1 | 3/2017 | Zhu et al. | |
| 2017/0164187 A1 | 6/2017 | Lu | |
| 2017/0367073 A1 | 12/2017 | Murugan et al. | |
| 2018/0034616 A1 | 2/2018 | Shen et al. | |
| 2018/0070250 A1 | 3/2018 | Venkataraman et al. | |
| 2019/0200406 A1 | 6/2019 | Henttonen et al. | |
| 2019/0357199 A1* | 11/2019 | Ali | H04W 48/18 |

FOREIGN PATENT DOCUMENTS

| | | |
|---|---|---|
| EP | 3313107 A1 | 4/2018 |
| WO | 2012/065423 A1 | 5/2012 |
| WO | 2012/163028 A1 | 6/2012 |
| WO | 2012/092838 A1 | 12/2012 |

* cited by examiner

CARRIER AGGREGATION AND DUAL CONNECTIVITY CAPABILITY EXCHANGE

RELATED APPLICATION

The subject patent application is a continuation of, and claims priority to, U.S. patent application Ser. No. 15/971,562, filed May 4, 2018, and entitled "CARRIER AGGREGATION AND DUAL CONNECTIVITY CAPABILITY EXCHANGE," the entirety of which application is hereby incorporated by reference herein.

TECHNICAL FIELD

The present application relates generally to the field of mobile communication and, more specifically, to conveying device capability information for in a next generation wireless communications network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
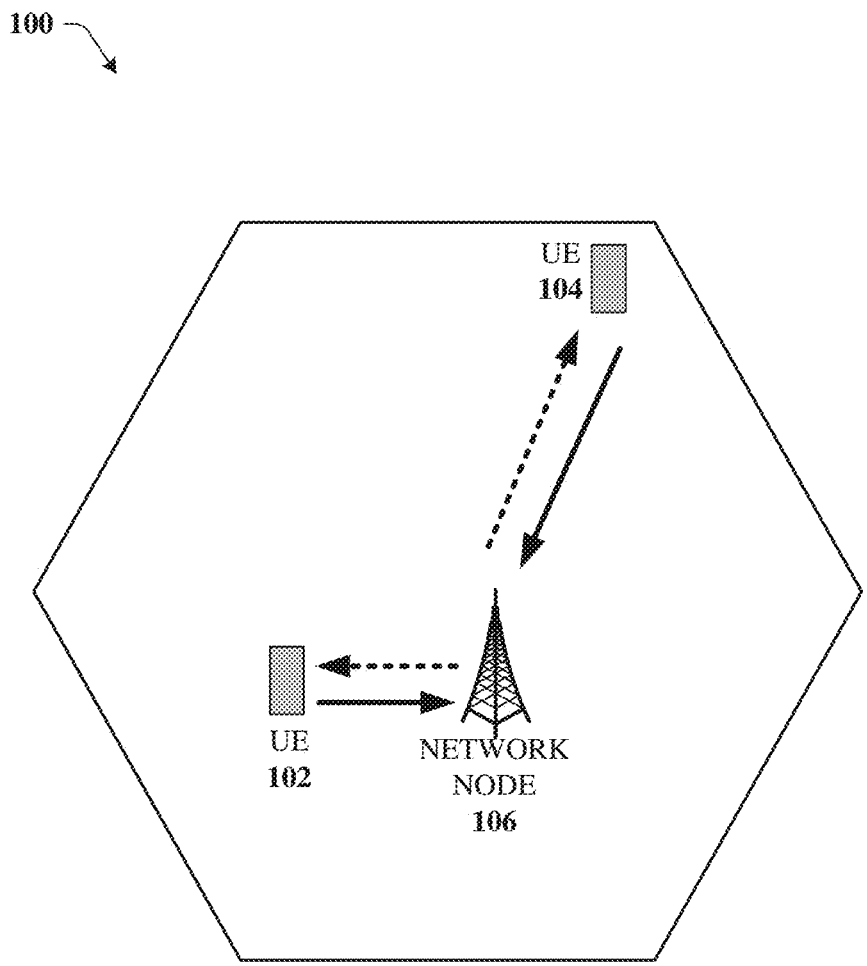
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for a compressed UE capability message that can indicate to a mobile network the various capabilities of the UE. In particular, the carrier aggregation and dual connectivity capabilities are compressed as disclosed herein. In traditional implementations, each carrier aggregation and dual connectivity combination and implementation that is supported is explicitly indicated in the message. As disclosed herein, rather than listing explicit combinations, the UE capability message can be compressed by instead listing boundary values of several different parameters which can be used by the network to derive the carrier aggregation and dual connectivity combinations. The UE capability message can also list the boundary values for LTE (Long Term Evolution), 5G NR (New Radio), and Dual Connectivity separately within the message to reduce ambiguity.

In various embodiments, a user equipment device can comprise a processor and a memory that stores executable instructions that, when executed by the processor facilitate performance of operations. The operations can comprise determining to transmit user equipment device capability information associated with a user equipment device to a base station device. The operations can also comprise generating a user equipment device capability information message comprising an indication of a protocol type and a group of boundary parameters associated with carrier aggregation for the protocol type. The operations can also comprise facilitating transmitting the user equipment device capability information message to the base station device.

In another embodiment, a method comprises determining, by a user equipment device comprising a processor, that a base station device is requesting information about a user equipment capability associated with carrier aggregation and dual connectivity. The method can also comprise generating, by the user equipment device, a user equipment capability message comprising a first group of boundary parameters associated with a first cellular protocol, a second group of boundary parameters associated with a second cellular protocol, and a third group of boundary parameters associated with dual connectivity of the first cellular protocol and the second cellular protocol. The method can also comprise facilitating, by the user equipment device, transmitting the user equipment capability message to the base station device.

In another embodiment, a machine-readable storage medium comprises executable instructions that, when executed by a processor of a device, facilitate performance of operations. The operations can comprise receiving a user equipment device capability message comprising a first group of boundary parameters associated with a first cellular protocol, a second group of boundary parameters associated with a second cellular protocol, and a third group of boundary parameters associated with dual connectivity of both the first and second cellular protocols. The operations can also comprise determining a first group of carrier aggregation combinations for the first cellular protocol based on the first group of boundary parameters. The operations can also comprise determining a second group of carrier aggregation combinations for the second cellular protocol based on the second group of boundary parameters. The operations can also comprise determining a third group of dual connectivity carrier aggregation combinations based on the third group of boundary parameters. The operations can also comprise configuring a transmission to the user equipment device based on at least one of the first group of carrier aggregation combinations, the second group of carrier aggregation combinations, and the third group of dual connectivity carrier aggregation combinations.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smart-phone, a tablet computer, a wearable device, a virtual reality (VR) device, a heads-up display (HUD) device, a smart car, a machine-type communication (MTC) device, and the like. UE 102 can also refer to any type of wireless device that communicates with a radio network node in a cellular or mobile communication system. Examples of UE 102 are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

In an embodiment, radio resource control (RRC) signaling can be established between network node 106 and UE 102 and/or 104. The RRC signaling can be established by either of the UEs or the network node 106, and in response to the RRC signaling, the network node 106 can send a capability request to UE 102 and/or 104. The capability message sent by the UE 102 or the UE 104 back to the network node 106 can include a variety information relating to the UE's radio access capabilities. One of the categories of capability information included is the carrier aggregation information and dual connectivity information, which can be very large.

Carrier aggregation allows mobile network operators to combine a number of separate LTE carriers. This enables them to increase the peak user data rates and overall capacity of their networks and to exploit fragmented spectrum allocations. In principle, carrier aggregation can be applied to either the FDD or TDD variants of LTE and it can be used to combine carriers whether or not they are contiguous or even in the same frequency band.

When carrier aggregation is used there are a number of serving cells, one for each component carrier. The coverage of the serving cells may differ, for example due to that component carriers (CCs) on different frequency bands will experience different path loss. The RRC connection is only handled by one cell, the primary serving cell, served by the primary component carrier (DL and UL PCC). It is also on the downlink (DL) PCC that the UE receives information such as security parameters. In idle mode the UE listens to system information on the DL PCC. On the UL PCC control channel is sent. The other component carriers are all referred to as secondary component carriers (DL and UL SCC), serving the secondary serving cells. The SCCs are added and removed as required, while the PCC is only changed at handover.

As there can be many different combinations of primary cells, serving cells, and different carrier aggregation combinations, especially as the aggregation level increases and MIMO transmissions become prevalent, the size of the capability message can become very large including up to 8 kB, which in some situations can cause the UE to fail to attach to the network, can cause failure of single radio voice call continuity (SRVCC) and even crash Universal Mobile Telecommunication Systems (UMTS) platforms under various embodiments. While newer UE models can start to support LTE-A carrier aggregation features such as 4×4MIMO, 4CCA (4 carrier aggregation levels), 5CCA and 6CCA, the number of CA combinations and size can increase quickly because a lot of CA combinations are simply subset (fall back options) from higher order CA combinations, quickly exceeding the 3GPP limit (128 combinations for R10 UE, 256 combinations for R11 UE and 384 combinations for R12 UE). The number of carrier aggregations can increase even further when 5G capabilities such as dual connectivity, is introduced.

Due to the large number of carrier aggregation combinations possible, some UE vendors could miss a few subsets of combinations when reporting UE capability, or some UE vendors may intentionally remove subsets to control the size of the capability message so that it remains within the prescribed size.

An example of a missing combination could be as follows. For a UE supporting 5CCA, if the underlined portion is missing, various outcomes can occur. For a 5CCA supporting UE: Pcell 2A-2A-12A-30A-66A would include all the 3CCA and 4CCA subset or fall back combinations listed below, except the underlined one:

Pcell 2A-2A-12A-30A
Pcell2A-2A-12A-66Amissing
Pcell 2A-2A-30A-66A
Pcell 2A-12A-30A-66A
Pcell 2A-2A-12A
Pcell 2A-2A-30A
Pcell 2A-2A-66A
Pcell 2A-12A-30A
Pcell 2A-12A-66A
Pcell 2A-30A-66A If this happens, the network may downgrade the link to a lower aggregation level, or not configure UE with 5CCA due to the missing subset/fallback option, resulting in potential throughput that is not achieved by using 5CCA. Alternatively, the network could allow the UE to get 5CCA initially, but then block the UE from stepping down to a 4CCA combination when the UE is out of the coverage of the scell, causing UE to send a large amount of A2 measurement report data without action from a base station device. Alternatively, the network could allow the UE to get 5CCA initially, and then when the UE reports A2 on B30, remove 2 scells (B30 and B66) so the UE can get to the 3CCA combination that is listed, once again resulting in potential throughput not achieved.

The solution, as disclosed herein is to reduce the size of LTE capability and NR capability messages using new "boundary parameters" under each category. UEs report LTE CA capability in a "LTE CA capability" section, and "NR CA capability" in a "NR CA capability" section of the UE capability message. Within the LTE CA and NR CA capability reporting sections, the UE can list only the band combo and use a short list of new "boundary parameters" to set support boundaries. The RAN can use this information to derive the exact supported CA capability from the UE. This avoids having to list all individual CA combinations repeating n times for pcell and layer information on each component carrier.

Figure 4:
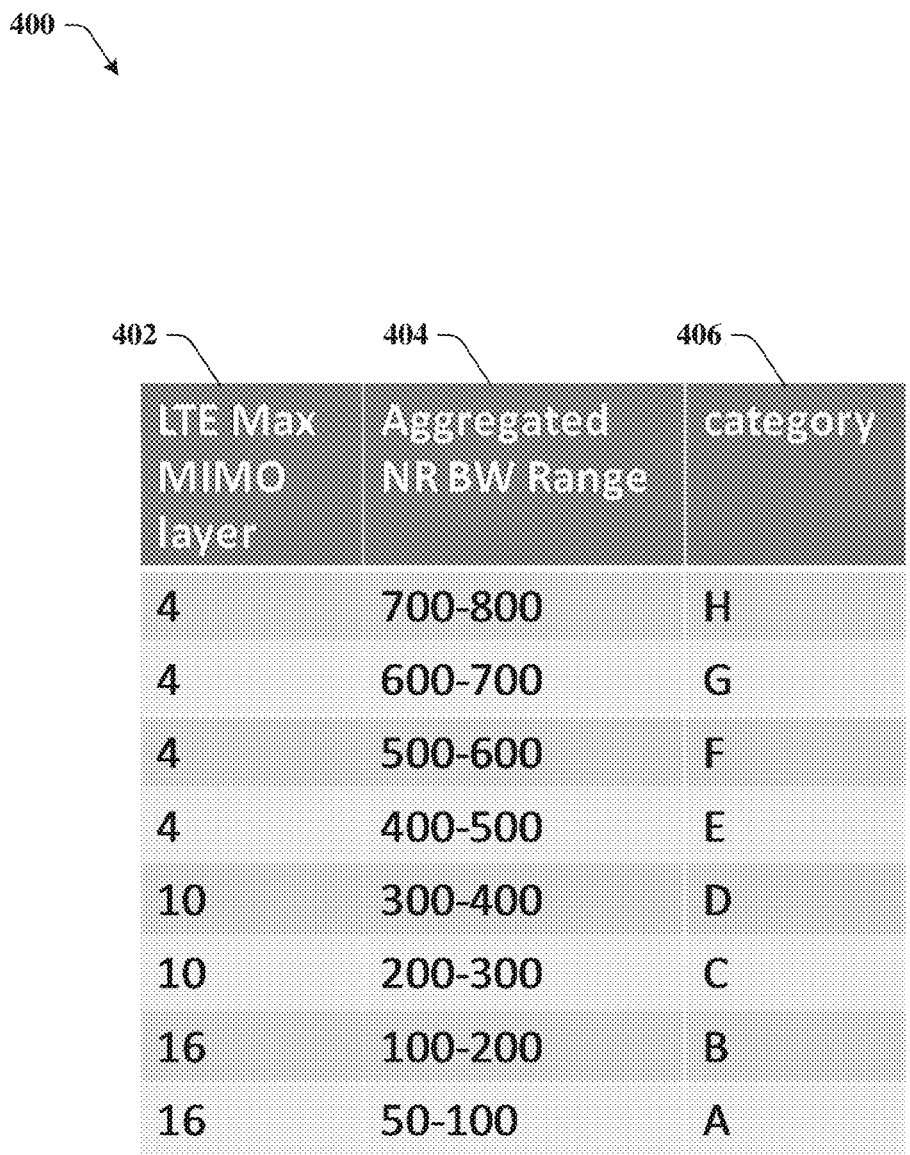
FIG. 4 illustrates an example block diagram of a linkage table for indicating multi radio access network dual connectivity capability in accordance with various aspects and embodiments of the subject disclosure.

For Multi-Ran Dual Connectivity (MR-DC), embodiments can decouple the LTE and NR capability reporting, not to replicate the existing information in LTE and NR capability, instead to use a new 'linkage' table to indicate how LTE and NR interdependency is defined including parameters such as "LTE Max MIMO Layer supported", "aggregated NR BW range", mapped to explicitly defined "category". The RAN can use such linkage table (e.g., FIG. 4) to precisely determine UE capability limitations and to use the appropriate CA/DC configuration when configuring CA/DC. The RAN/UE both indicate support of such new method under RAT Type-MRDC.

Figure 2:
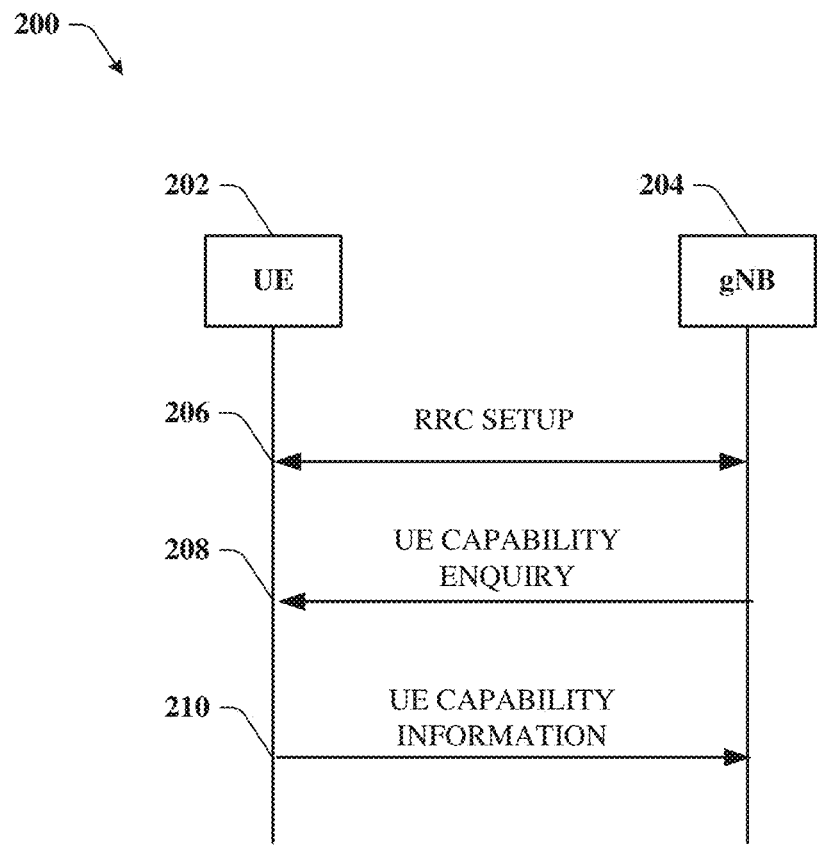
FIG. 2 illustrates an example block diagram showing a message sequence chart in accordance with various aspects and embodiments of the subject disclosure.

Turning now to FIG. 2, illustrated is an example block diagram showing a message sequence chart in accordance with various aspects and embodiments of the subject disclosure.

In an embodiment, a UE device 202 or a gNB 204 (or eNB, or other base station device or RAN device) can initiate RRC setup at 206. The gNB 204 can then send a UE capability enquiry 208 to the UE device 202 and the UE device 202 can send a UE capability message comprising UE capability information 210 back to the gNB 204. The UE capability message can comprise boundary parameters for different categories of capabilities, and the boundary parameters for LTE, NR, and MR-DC can be decoupled and transmitted separately. The gNB 204 can then use the boundary parameters to determine which carrier aggregation and dual connectivity combinations are possible.

Figure 3:
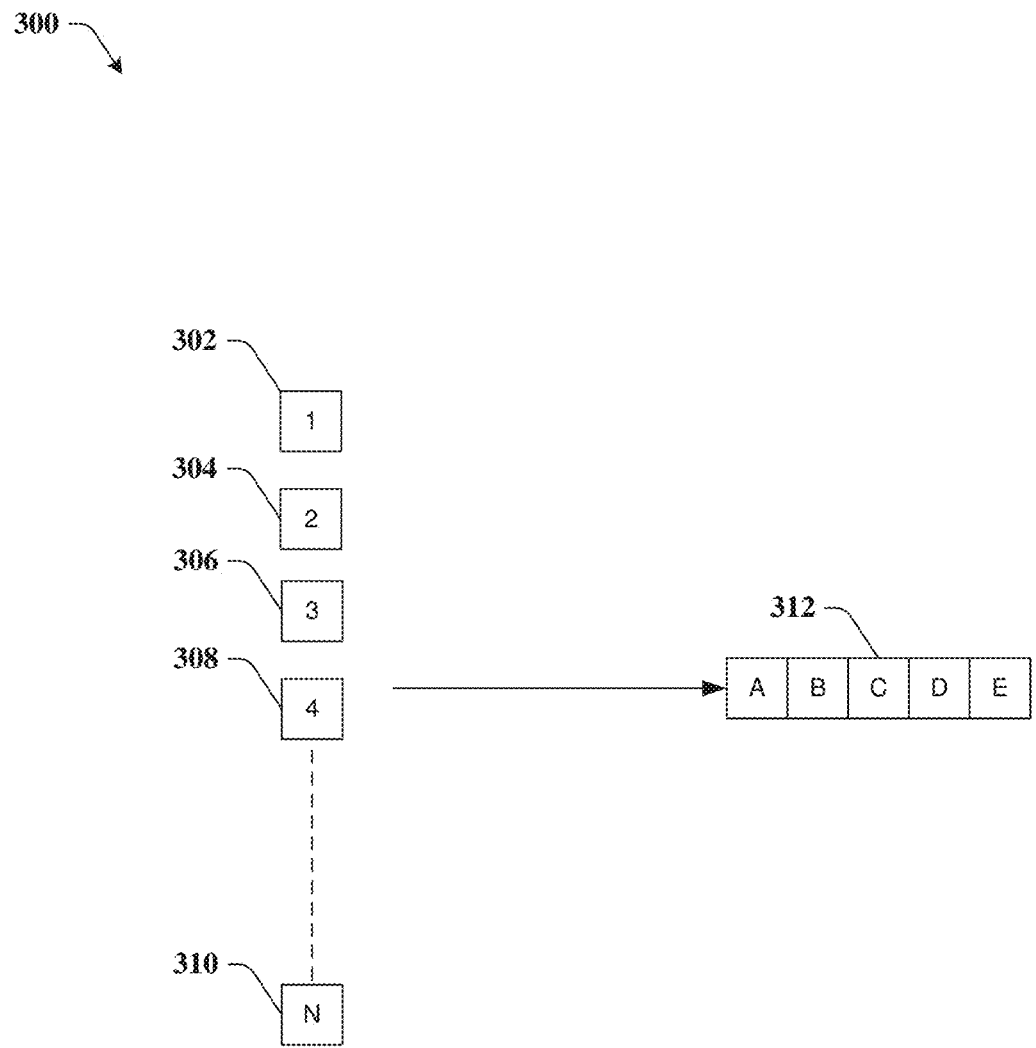
FIG. 3 illustrates an example block diagram showing a compressed UE (User Equipment) capability message in accordance with various aspects and embodiments of the subject disclosure.

Turning now to FIG. 3, illustrated is an example block diagram 300 showing a compressed UE (User Equipment) capability message in accordance with various aspects and embodiments of the subject disclosure.

In an embodiment, the UE capability message can comprise a series of discrete combinations that are supported, listed as 302, 304, 306, 308, all the way to 310 (which could include hundreds or more different combinations). Instead of listing all the combinations separately, the UE capability message can include boundary values for different parameters at 312, where each of A, B, C, D, and E can represent different boundary values.

As an embodiment, for an LTE portion of the UE capability message, the boundary parameters can be 1) a maximum number of layers supported by the user equipment device by a long term evolution protocol, 2) a maximum number of layers supported on each long term evolution carrier, 3) a maximum number of layers supported on each frequency band combination, 4) a carrier that is unable to be a primary cell under each frequency band combination, and 5) a parameter indicating that boundary parameters carrier aggregation signaling is supported by the RAN and user equipment device. The fifth parameter is a handshake between UE and RAN for the support of this new method, and can indicate to the RAN device that the UE is incorporating the compressed messaging sequence so that the RAN device does not attempt to look for explicitly indicated carrier aggregation combinations. Another parameter can also be included to indicate to the RAN device that these boundary parameters relate to the LTE protocol. In other embodiments, the location or placement of the parameters inside the UE capability message can be used by the RAN device to determine which boundary parameters relate to LTE, NR, and MR-DC.

In an embodiment, the boundary parameter 3 is only needed if the maximum number of layers on the band combination is less than the sum of each component carrier.

In an embodiment, for a UE that supports 5CCA, 2A-2A-12A-30A-66A, the band combo can be listed, and then if no "exclude pcell list" then every band can be a pcell. Additionally, if the max number of layer support on LTE is 10 then can assume that all are 2×2 MIMO. Furthermore, if the max number of layer support on LTE is 12, then consider the parameters 2, 3 for any carriers that can be 4 layers. Then all the subset 4C, 3C combos can be skipped following the parameters 2, 3 and 4.

In an embodiment, for an NR portion of the UE capability message, the boundary parameters can be 1) a maximum number of component carriers to aggregate, 2) a maximum component carrier bandwidth, 3) a maximum number of MIMO layers supported by the user equipment device on 5G NR, 4) a maximum number of layers supported on each component carrier, 5) a parameter indicating non-contiguous not supported, and 6) a parameter indicating whether boundary parameter carrier aggregation signaling is supported. The sixth parameter can indicate to the RAN device that the UE is incorporating the compressed messaging sequence so that the RAN device does not attempt to look for explicitly indicated carrier aggregation combinations.

In an example, a UE could indicate support for 1) 8CCA (8 supported component carriers, 2) a maximum component carrier bandwidth of 100 MHz, 3) up to 16 supported layers 4), up to 2 layers supported per carrier), and 5) non-contiguous support. This information is all that is needed for the RAN device to configure downlink and uplink communication channels according to the actual spectrum supported by the UE.

In an embodiment, for the MR-DC portion of the UE capability message, the parameters can indicate 1) a maximum number of long term evolution multiple input multiple output layers that are supported by the long term evolution protocol type, 2) and a parameter indicating a bandwidth range associated with the next generation new radio protocol type. In other embodiments, the parameters listed in a MR-DC portion of the UE capability message can reference linkage table 400 in FIG. 4, where the LTE MIMO layer index numbers 402 can be included in the input as well as the category selection 406 which relates to the aggregated NR bandwidth range 404. As an example, the parameter value can indicate cd_10 or efgh_4, indicating the ranges of supported aggregated NR bandwidth supported by MR-DC on the UE. With the first example of category C to D, this can indicate that up to 10 layers of LTE applicable to this band combo (up to 5C in LTE) when aggregated NR BW is 200-400 Mhz BW on n260. For the second example, for category E to H, this can indicate that the UE can support up to 4 layers of LTE applicable to this band combo (1C and 2C in LTE) when aggregated NR BW is 400-800 Mhz.

Figure 5:
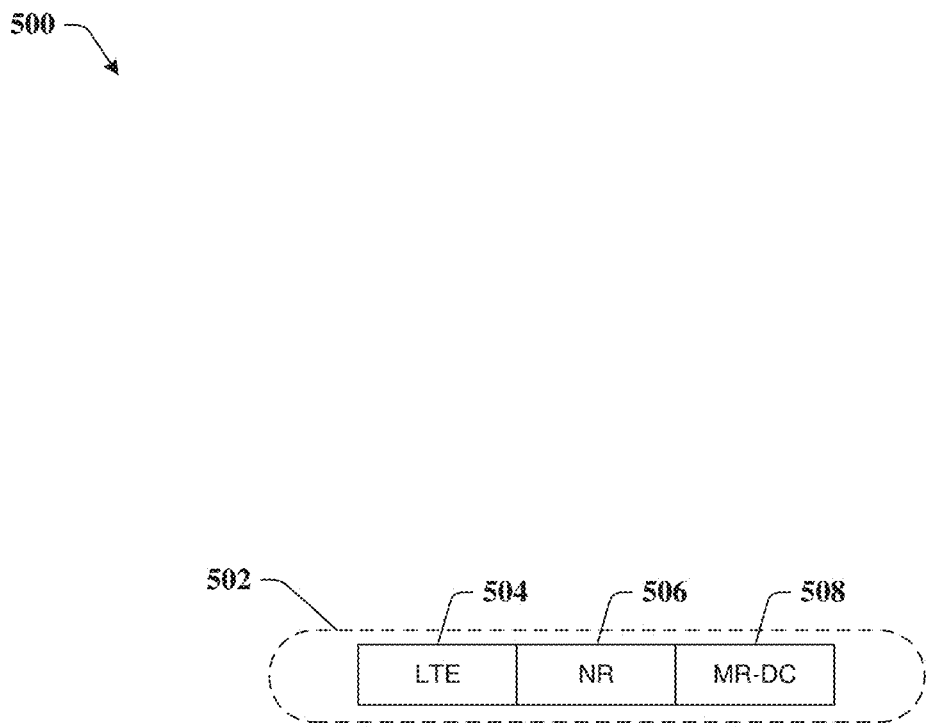
FIG. 5 illustrates an example block diagram showing a compressed UE (User Equipment) capability message in accordance with various aspects and embodiments of the subject disclosure.

Turning now to FIG. 5, illustrated is an example block diagram 500 showing a compressed UE (User Equipment) capability message 502 in accordance with various aspects and embodiments of the subject disclosure. The UE capability message 502 can include, among other containers, three containers 504, 506, and 508 related to LTE capability, NR capability, and MR-DC capability respectively. The aforementioned parameters in reference to FIGS. 3 and 4 can be located in each of these containers 504, 506, and 508 in the UE capability message 502.

Figure 6:
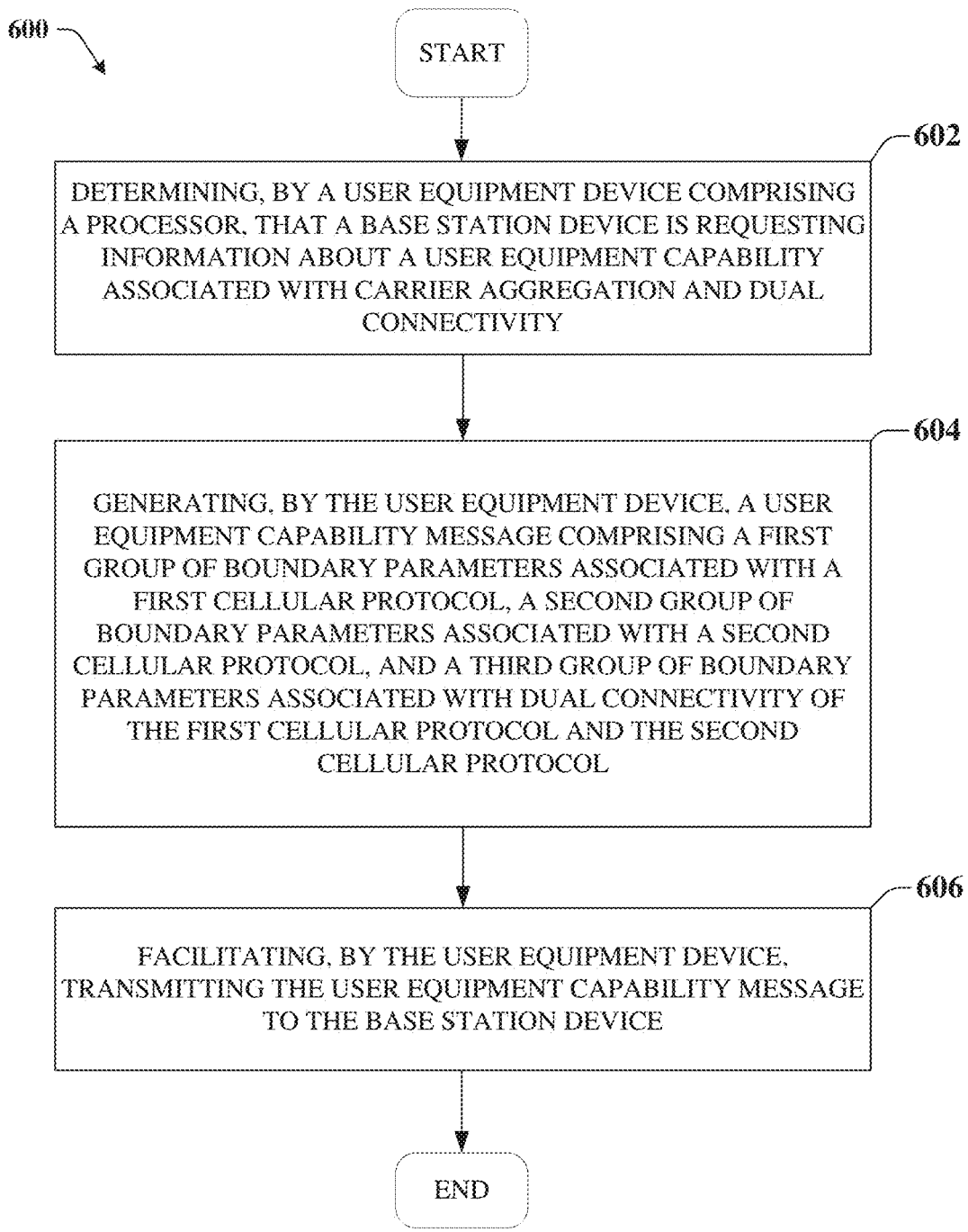
FIG. 6 illustrates an example method for compressing a UE capability message in accordance with various aspects and embodiments of the subject disclosure.
Figure 7:
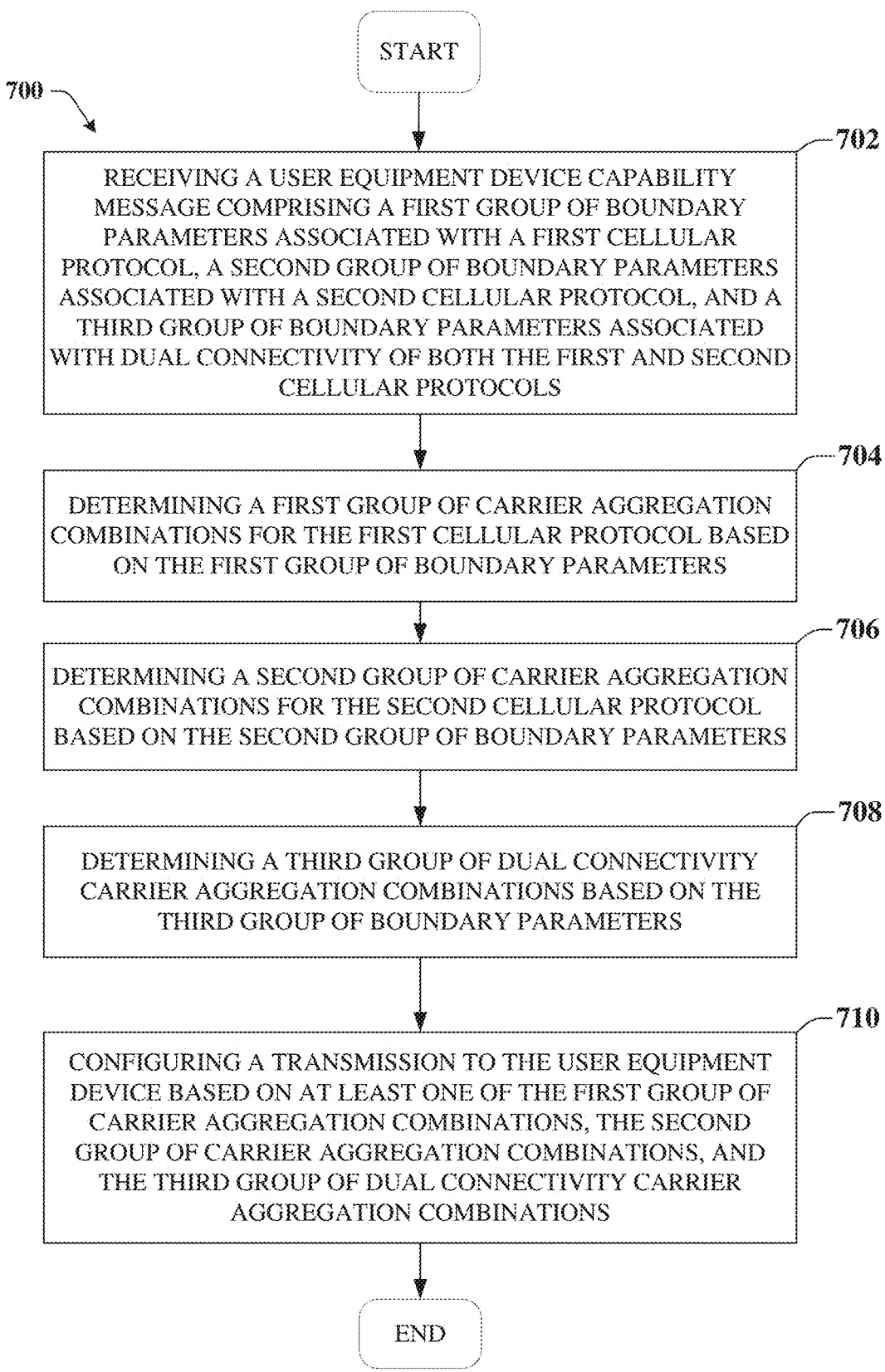
FIG. 7 illustrates an example method for compressing a UE capability message in accordance with various aspects and embodiments of the subject disclosure.
Figure 8:
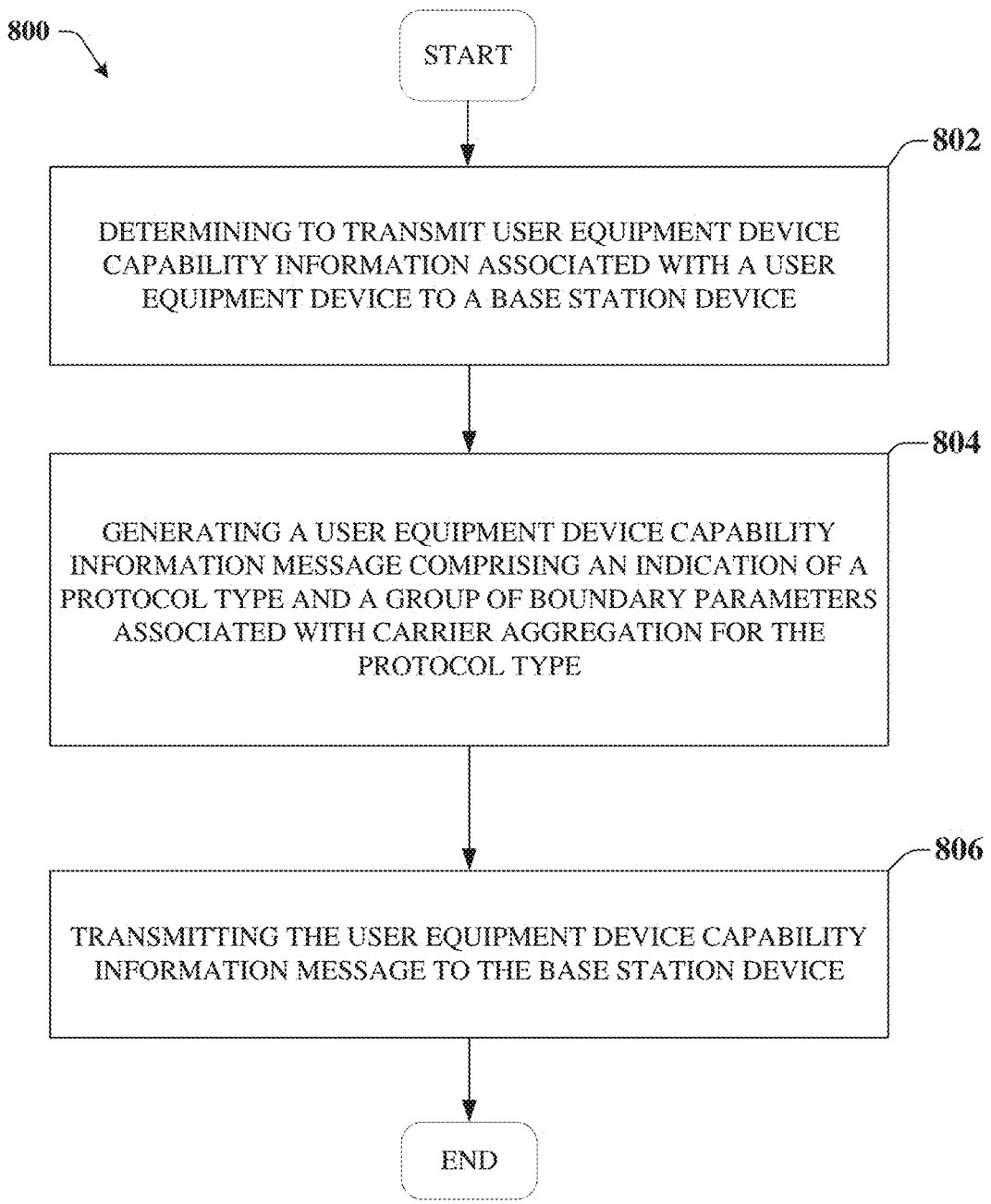
FIG. 8 illustrates an example method for compressing a UE capability message in accordance with various aspects and embodiments of the subject disclosure.

FIGS. 6-8 illustrate a processes in connection with the aforementioned systems. The processes in FIGS. 6-8 can be implemented for example by the systems in FIGS. 1-5 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 6 illustrates an example method for compressing a UE capability message in accordance with various aspects and embodiments of the subject disclosure.

Method 600 can begin at 602 where the method includes determining, by a user equipment device comprising a processor, that a base station device is requesting information about a user equipment capability associated with carrier aggregation and dual connectivity.

At 604, the method includes generating, by the user equipment device, a user equipment capability message comprising a first group of boundary parameters associated with a first cellular protocol, a second group of boundary parameters associated with a second cellular protocol, and a third group of boundary parameters associated with dual connectivity of the first cellular protocol and the second cellular protocol.

At 606, the method includes facilitating, by the user equipment device, transmitting the user equipment capability message to the base station device.

FIG. 7 illustrates an example method for compressing a UE capability message in accordance with various aspects and embodiments of the subject disclosure.

Method 700 can begin at 702 where the method includes receiving a user equipment device capability message comprising a first group of boundary parameters associated with a first cellular protocol, a second group of boundary parameters associated with a second cellular protocol, and a third group of boundary parameters associated with dual connectivity of both the first and second cellular protocols.

At 704, the method includes determining a first group of carrier aggregation combinations for the first cellular protocol based on the first group of boundary parameters.

At 706, the method includes determining a second group of carrier aggregation combinations for the second cellular protocol based on the second group of boundary parameters.

At 708, the method includes determining a third group of dual connectivity carrier aggregation combinations based on the third group of boundary parameters.

At 710, the method includes configuring a transmission to the user equipment device based on at least one of the first group of carrier aggregation combinations, the second group of carrier aggregation combinations, and the third group of dual connectivity carrier aggregation combinations FIG. 8 illustrates an example method for compressing a UE capability message in accordance with various aspects and embodiments of the subject disclosure.

Method 800 can begin at 802 wherein the method includes determining to transmit user equipment device capability information associated with a user equipment device to a base station device.

At 804, the method can include generating a user equipment device capability information message comprising an indication of a protocol type and a group of boundary parameters associated with carrier aggregation for the protocol type.

At 806, the method can include transmitting the user equipment device capability information message to the base station device.

Figure 9:
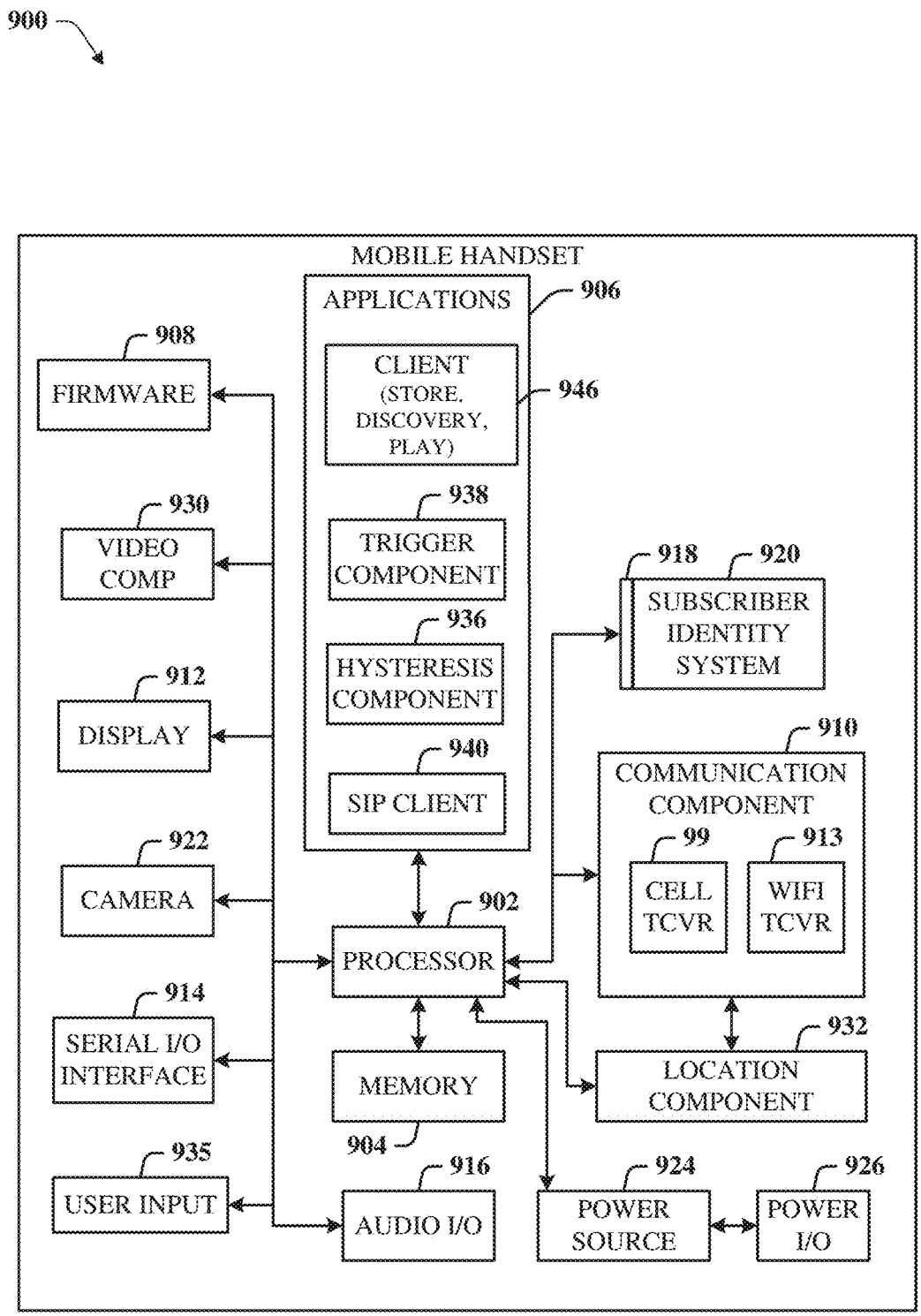
FIG. 9 illustrates an example block diagram of an example user equipment that can be a mobile handset operable to provide a format indicator in accordance with various aspects and embodiments of the subject disclosure.

Referring now to FIG. 9, illustrated is a schematic block diagram of an example end-user device such as a user equipment that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VOIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
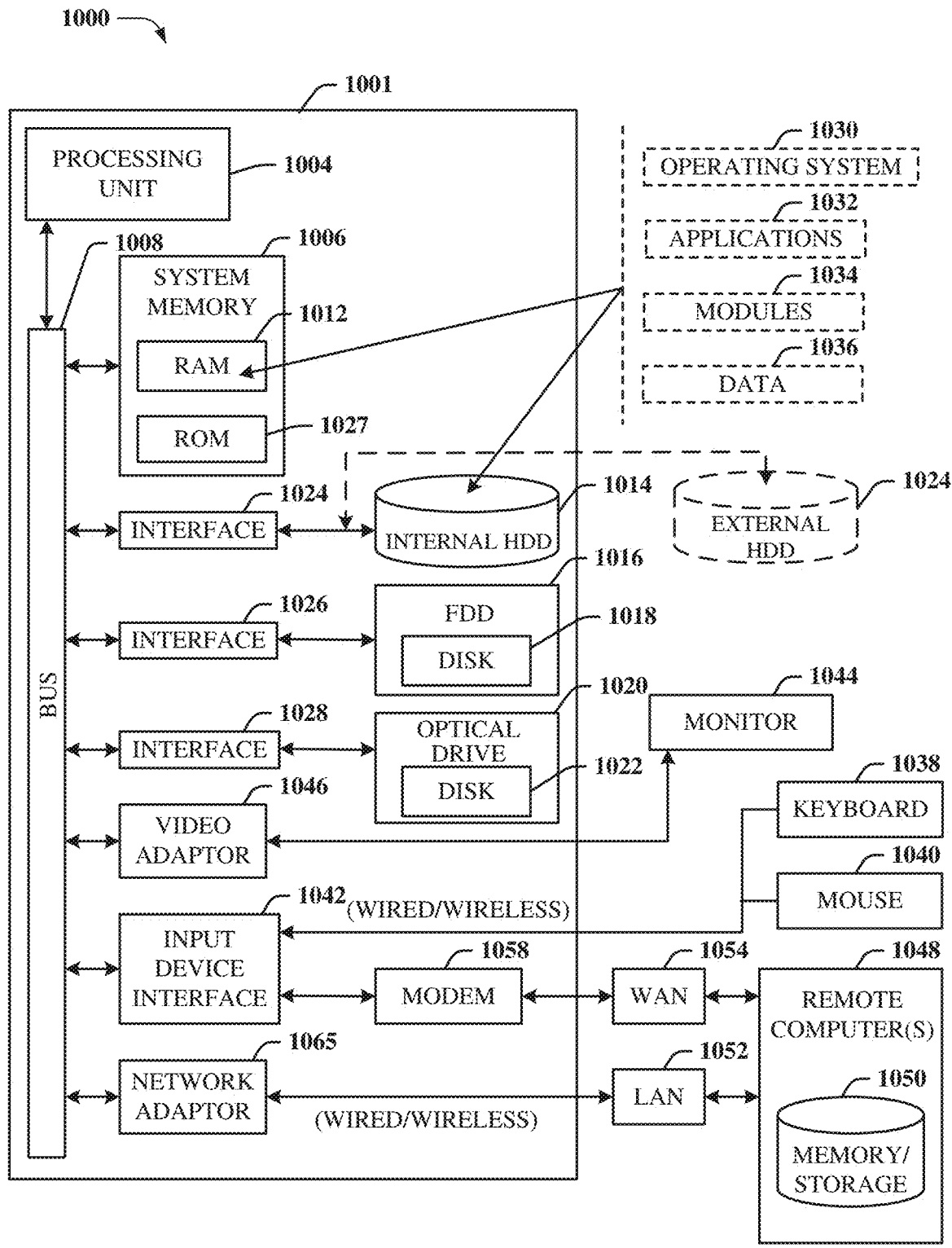
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 106, base station device 204, e.g.,) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media.

Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A user equipment, comprising:
   a processor; and
   a memory that stores executable instructions that, when executed by the processor, facilitate performance of operations, comprising:
      generating a user equipment capability information message for transmission to a base station, the user equipment capability information message comprising:
         a first indication of a first protocol type and a first group of boundary parameters associated with carrier aggregation for the first protocol type, wherein the user equipment capability information message comprises a first signal to indicate to the base station that the first group of boundary parameters incorporates a compressed messaging sequence;
         a second indication of a second protocol type and a second group of boundary parameters associated with carrier aggregation for the second protocol type, wherein the user equipment capability information message comprises a second signal to indicate to the base station that the second group of boundary parameters incorporates the compressed messaging sequence; and
         a third indication of a dual connectivity protocol type and a third group of boundary parameters associated with carrier aggregation for the dual connectivity protocol type; and
      transmitting the user equipment capability information message to the base station.

2. The user equipment of claim 1, wherein the first group of boundary parameters comprises at least one of:
   a maximum number of component carriers to aggregate;
   a maximum component carrier bandwidth;
   a maximum number of multi input multi output layers supported by the user equipment in connection with the second protocol type;
   a maximum number of layers supported on each component carrier; or
   the second signal, wherein the second signal comprises a parameter indicating whether boundary parameter carrier aggregation signaling is supported by the user equipment.

3. The user equipment of claim 1, wherein the second group of boundary parameters comprises at least one of:
   a maximum number of layers supported by the user equipment in connection with the first protocol type;
   a maximum number of layers supported on each carrier associated with the first protocol type;
   a maximum number of layers supported on each frequency band combination;
   a carrier that is unable to be a primary cell under each frequency band combination; or the first signal, wherein the first signal comprises a parameter indicating that boundary parameters carrier aggregation signaling is supported by the user equipment.

4. The user equipment of claim 1, wherein the first indication of the first protocol type indicates a next generation new radio protocol type.

5. The user equipment of claim 1, wherein the second indication of the second protocol type indicates a long term evolution protocol type.

6. The user equipment of claim 1, wherein the first signal indicates to the base station that the first group of boundary parameters incorporates the compressed messaging sequence and not explicitly indicated carrier aggregation combinations.

7. The user equipment of claim 1, wherein the dual connectivity protocol type is associated with dual connectivity of the first protocol type and the second protocol type.

8. The user equipment of claim 7, wherein the third group of boundary parameters comprises at least one of:
a long term evolution multiple input multiple output layers boundary parameter; or
a next generation new radio bandwidth range parameter.

9. A method, comprising:
receiving, by base station equipment comprising a processor, a user equipment capability message comprising:
a first indication of a first protocol type and a first group of boundary parameters associated with a first protocol type, wherein the user equipment capability message comprises a first signal to indicate to the base station equipment that the first group of boundary parameters incorporates a compressed messaging sequence;
a second indication of a second protocol type and a second group of boundary parameters for the second protocol type, wherein the user equipment capability message comprises a second signal to indicate to the base station equipment that the second group of boundary parameters incorporates the compressed messaging sequence; and
a third indication of a dual connectivity protocol type and a third group of boundary parameters for the dual connectivity protocol type;
determining, by the base station equipment, a first group of carrier aggregation combinations for a user equipment based on the compressed messaging sequence of the first group of boundary parameters; and
configuring, by the base station equipment, a transmission to the user equipment based on at least one carrier aggregation combination of the first group of carrier aggregation combinations.

10. The method of claim 9, further comprising configuring, by the base station equipment, a radio resource control signaling request transmission for transmission to the user equipment.

11. The method of claim 9, wherein the first indication of the first protocol type indicates a next generation new radio protocol type.

12. The method of claim 9, further comprising:
determining, by the base station equipment, a second group of carrier aggregation combinations for the user equipment based on the compressed messaging sequence of the second group of boundary parameters; and
configuring, by the base station equipment, a transmission to the user equipment based on at least one carrier aggregation combination of the second group of carrier aggregation combinations.

13. The method of claim 9, wherein the third group of boundary parameters comprises a reference to a linkage table.

14. The method of claim 9, wherein the second protocol type is a long term evolution protocol type, and wherein the second group of boundary parameters comprises at least one of:
a long term evolution user equipment layers boundary parameter
a first frequency band layers boundary parameter; or
a primary cell boundary parameter.

15. A non-transitory machine-readable medium, comprising executable instructions that, when executed by a processor, facilitate performance of operations, comprising:
receiving a user equipment capability message comprising a first group of boundary parameters associated with a first cellular protocol, wherein the user equipment capability message comprises a first signal to indicate that the first group of boundary parameters incorporates a compressed messaging sequence, a second group of boundary parameters associated with a second cellular protocol, wherein the user equipment capability message comprises a second signal to indicate that the second group of boundary parameters incorporates the compressed messaging sequence, and a third group of boundary parameters associated with dual connectivity of both the first and second cellular protocols;
wherein the first group of boundary parameters comprises at least a carrier layers boundary parameter according to the compressed messaging sequence;
determining a first group of carrier aggregation combinations for the first cellular protocol based on the carrier layers boundary parameter according to the compressed messaging sequence;
determining a second group of carrier aggregation combinations for the second cellular protocol based on the second group of boundary parameters according to the compressed messaging sequence;
determining a third group of dual connectivity carrier aggregation combinations based on the third group of boundary parameters; and
configuring a transmission to the user equipment based on at least one of the first group of carrier aggregation combinations, the second group of carrier aggregation combinations, or the third group of dual connectivity carrier aggregation combinations.

16. The non-transitory machine-readable medium of 15, wherein the first signal to indicate that the first group of boundary parameters incorporates the compressed messaging sequence is included in the first group of boundary parameters associated with the first cellular protocol.

17. The non-transitory machine-readable medium of 15, wherein determining the third group of dual connectivity carrier aggregation combinations is based on a result of matching the third group of boundary parameters to a linkage data structure associated with boundary parameters carrier aggregation signaling.

18. The non-transitory machine-readable medium of 15, wherein the first cellular protocol is a next generation new radio protocol, and wherein the second cellular protocol is a long term evolution protocol.

19. The non-transitory machine-readable medium of 18, wherein the first group of boundary parameters further comprises at least one of:
- an aggregate component carriers boundary parameter;
- a component carrier bandwidth boundary parameter; or
- a user equipment layers boundary parameter.

20. The non-transitory machine-readable medium of 18, wherein the second group of boundary parameters comprises at least one of:
- a long term evolution user equipment layers boundary parameter;
- a first frequency band layers boundary parameter; or
- a primary cell boundary parameter.

* * * * *